(12) United States Patent
Sinha et al.

(10) Patent No.: US 9,197,501 B2
(45) Date of Patent: Nov. 24, 2015

(54) ZERO-STEP AUTO-CUSTOMIZATION OF MOBILE APPLICATIONS

(71) Applicants: Anand Sinha, Bangalore (IN); Vinay Sheel, Bangalore (IN); Gowda Timma Ramu, Bangalore (IN)

(72) Inventors: Anand Sinha, Bangalore (IN); Vinay Sheel, Bangalore (IN); Gowda Timma Ramu, Bangalore (IN)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 13/962,967

(22) Filed: Aug. 9, 2013

(65) Prior Publication Data

US 2015/0046994 A1 Feb. 12, 2015

(51) Int. Cl.
| | |
|---|---|
| H04L 29/06 | (2006.01) |
| H04L 12/24 | (2006.01) |
| H04W 12/06 | (2009.01) |
| H04W 12/02 | (2009.01) |

(52) U.S. Cl.
CPC ............ *H04L 41/0806* (2013.01); *H04L 63/08* (2013.01); *H04W 12/06* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,496,979 | B1 | 12/2002 | Chen et al. |
| 7,685,263 | B2 | 3/2010 | Redjaian et al. |
| 8,204,870 | B2 | 6/2012 | Mukkamala et al. |
| 8,255,901 | B2 | 8/2012 | Halbedel et al. |
| 8,353,001 | B2 | 1/2013 | Herrod |
| 8,359,016 | B2 | 1/2013 | Lindeman et al. |
| 8,370,428 | B1 | 2/2013 | Bayliss et al. |
| 8,769,553 | B2 | 7/2014 | Nigam |
| 2007/0167182 | A1* | 7/2007 | Tenhunen et al. ............. 455/512 |
| 2010/0281243 | A1* | 11/2010 | Herzog et al. ..................... 713/1 |
| 2010/0299719 | A1* | 11/2010 | Burks et al. ........................ 726/3 |
| 2012/0240183 | A1 | 9/2012 | Sinha |
| 2012/0254768 | A1 | 10/2012 | Aggarwal et al. |
| 2012/0311659 | A1 | 12/2012 | Narain et al. |
| 2013/0046894 | A1 | 2/2013 | Said et al. |
| 2013/0066976 | A1* | 3/2013 | Massey et al. ................ 709/206 |
| 2013/0067208 | A1* | 3/2013 | Brinkman et al. ................ 713/1 |
| 2013/0078947 | A1 | 3/2013 | Pecen et al. |
| 2013/0086669 | A1 | 4/2013 | Sondhi et al. |
| 2013/0110683 | A1 | 5/2013 | Ntawanga et al. |

(Continued)

OTHER PUBLICATIONS

Bill N. Schilit, Marvin M. Theimer, Brent B. Welch; Customizing Mobile Applications; Proceedings USENIX Symposium on Mobile & Location-inderident Computing; Aug. 1993; p. 1-9; Xerox Corporation; Palo Alto; California.

*Primary Examiner* — Andrew Nalven
*Assistant Examiner* — Huan V Doan

(57) ABSTRACT

In an embodiment, mobile application downloaded and installed in a mobile device is launched for the first time. The mobile application automatically locates a configuration server and connects automatically to the located configuration server. After connection is established with the configuration server, appropriate configuration parameters set is identified and automatically fetched to the mobile device. The fetched configuration parameters set is automatically applied to the mobile application. After applying the configuration parameters set, automatically authenticate the mobile application to an enterprise server. Thus, when the user of the mobile device launches the installed mobile application for the first time, the zero-step auto-customization noted above takes place without manual intervention. The user is thus able to use the mobile application in a normal manner subject to the configurations applied.

17 Claims, 6 Drawing Sheets

(56) References Cited

U.S. PATENT DOCUMENTS

2013/0110765 A1  5/2013  Heidasch
2013/0117719 A1  5/2013  Bender et al.
2013/0159484 A1  6/2013  Sabarish
2014/0007222 A1* 1/2014  Qureshi et al. ................. 726/16

* cited by examiner

ZERO-STEP AUTO-CUSTOMIZATION OF MOBILE APPLICATIONS

BACKGROUND

Some enterprises provide mobile devices to employees to stay connected with the business and discharge their responsibilities efficiently, while some enterprises authorize employees to purchase and use a mobile device of their choice to stay connected with the business. Employees often tend to download varied mobile applications from public distribution channels to their mobile devices. Enterprise would like to customize the mobile applications to include branding, provide enterprise connectivity, enforce usage restrictions etc., before the first use of the downloaded mobile applications. But often, employees directly install mobile applications from the public distribution channels and start using them, without giving the administrators an opportunity to customize the mobile applications. Thus it is challenging to customize such downloaded mobile applications before their first use.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
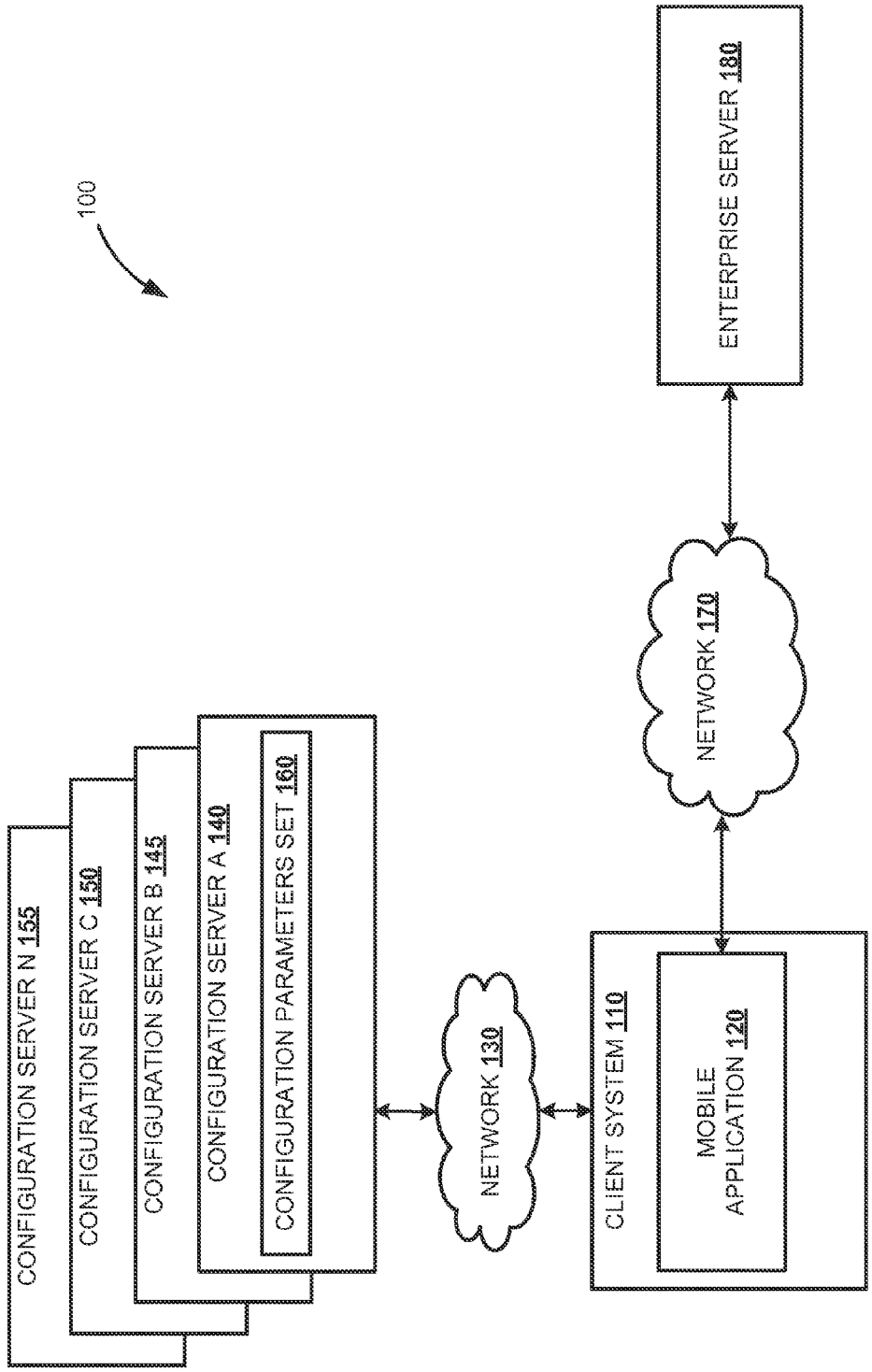
FIG. 1 is a block diagram illustrating an overview of an exemplary environment for zero-step auto-customization of mobile applications, according to an embodiment.

Embodiments of techniques for zero-step auto-customization of mobile applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Typically, when an enterprise provides mobile devices to employees, enterprise enforces installations and configurations of necessary customizations in the mobile device, to make it compliant with the enterprise standards. In a scenario where enterprise authorizes employees to purchase and use mobile devices of their choice, employees lend to download mobile applications from public distribution channels and install on the mobile devices and use. The enterprise administrators do not get an opportunity to enforce configurations and customizations on the mobile applications, downloaded from the public distribution channels.

Some enterprises request source code from the mobile applications vendors, and develop a customized version for some of the mobile applications, and distribute these customized versions to the employees. But as the number of mobile applications increase drastically, this is not a scalable solution, as it tremendously increases custom development and maintenance effort for any enterprise. Whereas, some enterprises request the mobile applications vendors to develop customized version of mobile applications for their enterprise use, and ship it directly using business-to-business channels of distribution. The challenge here is that, mobile applications vendors may not have the bandwidth to take up customization request from every enterprise using their mobile applications. Further, the mobile applications vendors will be required to develop and maintain versions of the same mobile application for every enterprise in an on-going basis.

Some enterprises mandate installation of mobile device management software agent on mobile devices that allows receiving of configurations for mobile application customizations. Mobile device management (MDM) software monitors, manages, and supports, mobile devices by enabling distribution of one or more applications, data and configurations for mobile devices. MDM agent installations are generally disliked by the employees, because enterprises enforce many other usage restriction and security restriction on the mobile devices. Further, MDM agents are required to be installed and managed in every mobile device. Therefore, employees require an automatic configuration and customization of mobile applications, in zero-step without manual intervention.

FIG. 1 is a block diagram illustrating an overview of an exemplary environment for zero-step auto-customization of mobile applications, according to an embodiment. The exemplary environment 100 is shown containing client system 110 with installed mobile application 120, network 130, configuration servers A 140, B 145, C 150 and N 155, network 170 and enterprise server 180. Merely for illustration, only a representative number and type of systems is shown in FIG. 1. Often, environments contain more systems (e.g., more configuration servers and enterprise servers), both in number and type, depending on the purpose for which an environment is designed. Each system/device of FIG. 1 is described below in further detail.

Network 130 provides connectivity between configuration servers A to N and client system 110. Network 170 provides connectivity between enterprise server 180 and client system 110. Network 130 and 170 may be implemented using protocols such as Transmission Control Protocol (TCP) and/or Internet Protocol (IP). In one embodiment network 130 and network 170 can be the same network implemented using any of the protocols noted above. The client system 110 can be a computing device such as a mobile phone or a tablet computer used by end users. Mobile application 120 is downloaded from a public distribution channel and installed in the client system 110. When the mobile application 120 is launched from the client system 110 for the first time, the mobile application 120 automatically determines a configuration server A 140 from among a set of configuration servers, and connects to the configuration server A 140.

Once connection is established with the configuration server A 140, appropriate configuration parameters set 160 is identified, and automatically fetched from the configuration server A 140 to the client system 110. Fetching includes sending data implicitly or explicitly in a query, and correspondingly receiving associated information in response to the query. Fetching can be one time receiving or it can be receiving in portions. The fetched configuration parameters set 160 is automatically applied to the mobile application 120. After applying the configuration parameters set 160, the mobile application is automatically authenticated to an enterprise server 180. Thus, when the user of the client system 110 launches the installed mobile application 120 for the first time, the sequence of steps noted above are automatically performed without manual intervention, and the user is able to use the mobile application 120 in a normal manner subject to the configuration parameters set 160 applied. The example embodiments illustrated below using FIG. 2 to FIG. 4, describe in detail the zero-step auto-customization of mobile applications as noted above.

Figure 2:
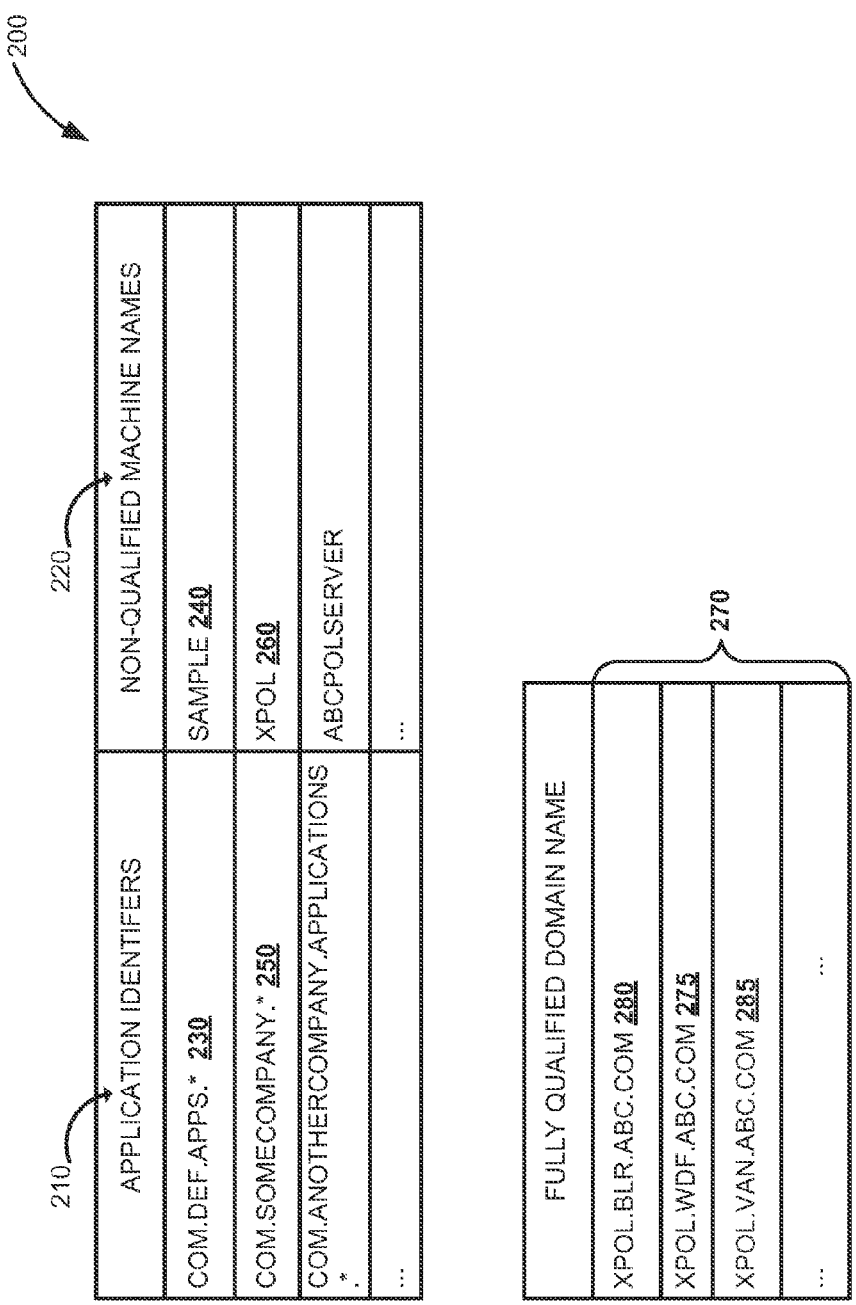
FIG. 2 illustrates a registry providing mapping information for mobile applications, according to one embodiment.

In one embodiment, mobile applications are standardized and developed in a way that, after installation of a mobile application in a mobile device, the mobile application automatically locates an appropriate configuration server, and establishes connection to the located configuration server. The mobile application installed in the mobile device can ping a network for locating the configuration servers within the network. Ping is merely exemplary, various types of mechanisms and protocols to locate the configuration server, such as, by defining in web configuration file, using broadcasting or multi-casting solutions such as service location protocol, using service discovery protocols, using neighbor discovery protocol, etc., can be used. FIG. 2 illustrates a registry providing mapping information for mobile applications, according to one embodiment. Every mobile application is developed with a unique identifier referred to as an application identifier. Application identifier enables unique identification of the mobile application.

Registry 200 is created, with application identifiers 210 mapped to corresponding non-qualified machine names 220. In one embodiment, registry can be a public registry, private registry, hosted file, and the like. Non-qualified machine names represent names of the configuration servers as defined by administrators of the enterprise. In registry 200, an application identifier 'COM.DEF.APPS,*' 230 is mapped to a non-qualified machine name 'SAMPLE' 240. The non-qualified machine names can be resolved based on geographical location or network of the mobile device, to appropriate machines with the corresponding fully qualified domain name (FQDN). FQDN is a complete domain name for a specific computer/machine or host on the internet. For example, the non-qualified machine name 'XPOL' 260 can be resolved based on network of the mobile device, to one of the configuration servers with the FQDN as shown in 270.

For example, 'user A' has installed a mobile application with application identifier 'COM.SOMECOMPANY.*' 250. Application identifier 'COM.SOMECOMPANY.*' 250 is mapped to non-qualified machine name 'XPOL' 260 in the registry 200, 'User A' is located in 'Waldorf' network, accordingly the non-qualified machine name 'XPOL' 260 resolves to a FQDN 'XPOL.WDF.ABC.COM' 275. Similarly for a user located in 'Bangalore' network, the non-qualified machine name 'XPOL' 260 resolves to the FQDN 'XPOL.BLR.ABC.COM' 280 and for a user located in 'Vancouver' network, the non-qualified machine name 'XPOL' 260 resolves to the FQDN 'XPOL.VAN.ABC.COM' 285. These machines with the FQDN as shown in 270 become the configuration servers across geography/network for the enterprise ABC.

Figure 3:
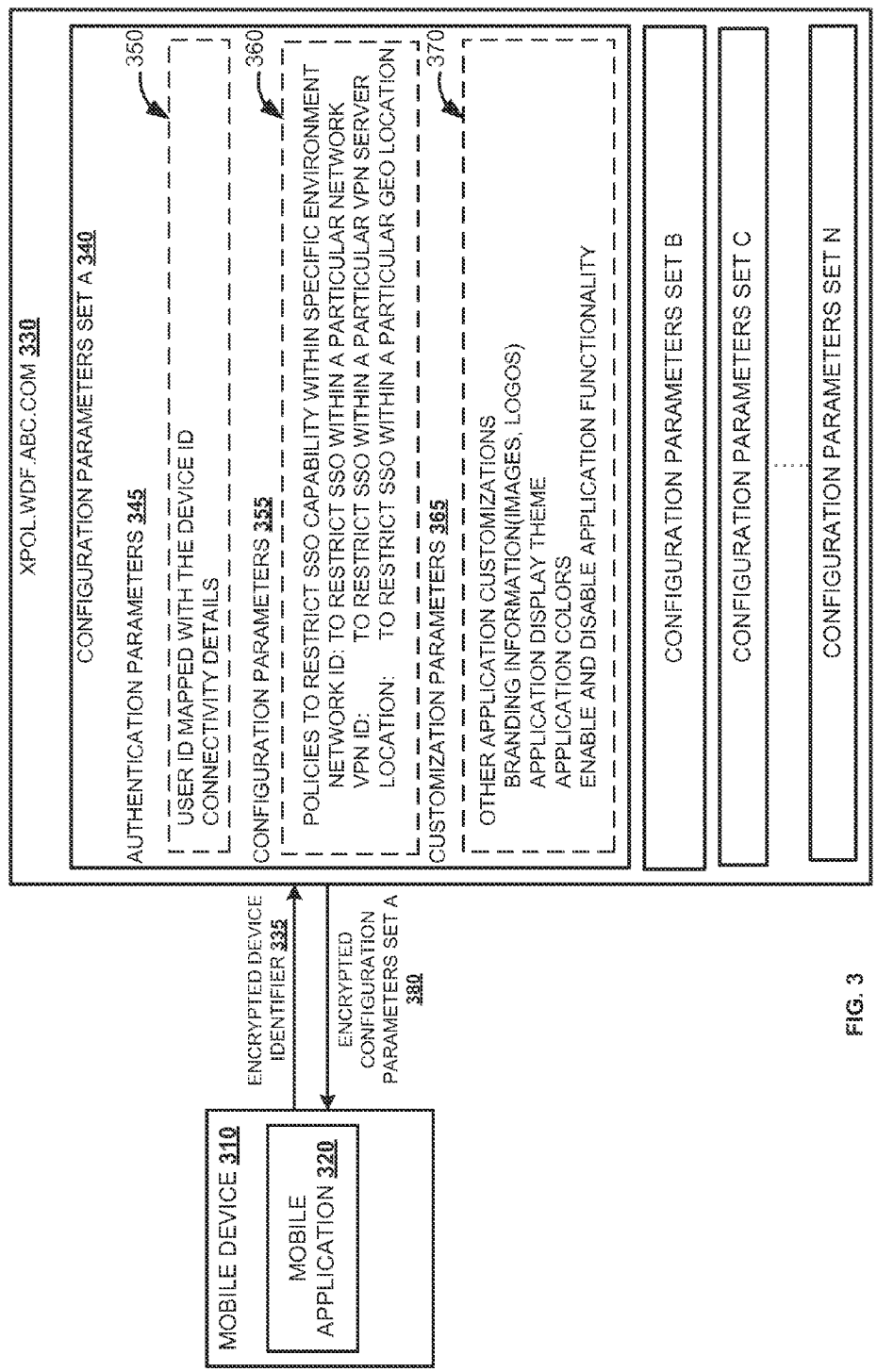
FIG. 3 illustrates a scenario of identifying configuration parameters set, according to one embodiment.

FIG. 3 illustrates a scenario of identifying configuration parameters set, according to one embodiment. Mobile application 320 installed in a mobile device 310 of 'User A', automatically connects to the resolved configuration server 'XPOL.WDF.ABC.COM' 330. After the connection is established with the configuration server, the mobile application 320 sends an encrypted device identifier 335 associated with the mobile device 310, to the configuration server 'XPOL.WDF.ABC.COM' 330. At the configuration server, based on the received encrypted device identifier 335, 'configuration parameters set A' 340 is automatically identified, and sent to the mobile application 320 installed in the mobile device 310 of 'User A'. In one embodiment, identification can be performed by matching the received encrypted device identifier 335 with a set of predefined device identifier values stored in the configuration server 330. Matching is merely exemplary, various types of identification mechanisms such as mapping encrypted device identifier to a class of mobile device or device type, providing default configuration parameters set based on the request type, etc., can be used.

For example, for an encrypted device identifier 'Z&^F#@LTY' sent from the mobile device 310 of 'User A', the encrypted device identifier 'Z&^F#@LTY' is matched to identify the configuration parameters set as 'configuration parameters set A' 340 from among the configuration parameters sets available. The 'configuration parameters set A' 340 includes authentication parameters 345, configuration parameters 355, customization parameters 365 and other parameters as applicable. The number and type of parameters are merely illustrative and may vary for every mobile application. The authentication parameters 345 include parameters 350 such as 'user id' mapped with the received device identifier, connectivity details corresponding to the enterprise server, and the like. If the received device identifier has access to the enterprise server, then the 'user id' along with a password provided in the authentication parameters, enables automatic authentication to the enterprise server. If no 'user id' is mapped with the device identifier, 'guest id' can be provided. Access using 'guest id' has limited privileges in comparison to access using 'user id'. Connectivity details includes details required to establish connection with the enterprise server such as database connection parameters, host name, port number, server certificate, etc. Based on the received encrypted device identifier, these authentication parameters 345 are encrypted and sent to the mobile device 310 as a part of 'configuration parameters set A' 340.

The configuration parameters 355 include policies, rules, restriction conditions, settings, etc. Policies can be defined to restrict single sign-on capability for a user of the mobile device 310, as shown in 360. Single sign-on capability is a property of access control, in which a user logs in once in a software, and gains access to multiple related independent software. While defining the policy, network identifier can be specified to restrict the single sign-on capability to be within a particular network, virtual private network (VPN) identifier can be specified to restrict the single sign-on capability when connected via a particular virtual private network server, and location can be specified to restrict the single sign-on capability within a particular geographic location or network. For example, whenever 'User B' is connecting from home network, the single sign-on capability for 'User B' can be restricted. Rules can be specified, to determine if a certain criteria is met, and accordingly perform associated actions. For example, a rule can be defined such that, if 'User C' is a contract employee, then 'User C' should not receive emails intended for permanent employees. Rules can also be specified as restriction conditions where the users are restricted from performing a set of defined actions. For example, employees are restricted from accessing social networking sites from within the mobile application.

The customization parameters 365 include user interface related customizations such as visual presentation, personalization, stylistic compliance, etc., and functionality related customizations such as disabling offline storage on the mobile device, disabling sending of emails from within the mobile application, etc. Typically, enterprises have a standard theme, color, font, size of user interface elements, etc., in their applications. The customization parameters are specified in 370, for example, brand and logo of an enterprise can be specified in the branding information. Theme, in which the mobile application needs to be displayed, can be specified in the application display theme. Color in which the mobile application needs to be displayed can be specified in the application colors. Certain functionalities in the mobile application are required to be enabled and disabled based on the profile of the employee. Such enabling and disabling of functionalities can be specified in enable and disable application functionality. For example, contract employee 'User C' should not be allowed offline storage on the mobile device and accordingly offline storage option needs to be disabled for 'User C'.

The mobile device 310 may automatically fetch the 'configuration parameters set A' 340 comprising authentication parameters 345, configuration parameters 355, and customization parameters 365, in an encrypted form as 'encrypted configuration parameters set A' 380. In one embodiment, the 'configuration parameters set A' can be stored in a file external to the software application executing in the configuration server. When the 'configuration parameters set A' is externalized and stored in the file, and not hardcoded in the software application, managing and replacing the file dynamically is easier.

When the mobile application 320 is launched for the first time, and the 'encrypted configuration parameters set A' 380 is fetched from the configuration server XPOL.WDF.ABC.COM 330, the 'encrypted configuration parameters set A' 380 is cached in the mobile application 320. During subsequent connections to the configuration server XPOL,WDF.ABC.COM 330, the mobile application 320 looks for changes or modifications from the last cached content. For example, entity tag (Etag) and 'if-modified-since' conditional request-header field can be used to look for modifications from the last cached content. Etag in hypertext transfer protocol (HTTP)/HTTPS can be used to make conditional request. Independent version of the content is assigned an Etag. These Etags are compared, to determine if two versions of the content are same or not. Based on this comparison, only modified portion is requested from the configuration server. Another example would be to use 'if-modified-since' conditional request-header field in the HTTP request. 'If-modified-since' is specified along with a date on which the content was last fetched. When 'if-modified-since' request-header field is specified in the request, then only if the content is modified since the date specified, then the content is fetched from the configuration server. Else, if the content is not modified, no content is fetched from the configuration server.

The fetched 'encrypted configuration parameters set A' 380 is automatically applied to the mobile application 320. For example, based on the 'configuration parameters set A' 340, the mobile application can be re-branded with the fetched customization parameters 365 such as enterprise logo, images, and etc. The mobile application's display theme and color is applied as fetched in the 'configuration parameters set A' 340. Functionality related customizations such as enabling and disabling are also applied in the mobile application 320. A connection is established automatically with the enterprise server, based on the connectivity details, 'user id' and password fetched in the authentication parameters 345 of the 'configuration parameters set A' 340. This connection established, is a personalized connection for the user of the mobile device 310. While establishing connection to the configuration server, policies in the configuration parameters 355 to restrict single sign-on capability for the user of the mobile device are applied.

In one embodiment, initial set of configurations can be fetched from one configuration parameters set, which could lead to additional configurations to be fetched from other configuration parameters sets. For example, initial set of configurations can be fetched from 'configuration parameters set A' 340 to the mobile application, this initial set of configurations could lead to additional configurations to be fetched from 'configuration parameters set B', 'configuration parameters set C' or 'configuration parameters set N'. The initial set of configurations fetched can have a link to the next set of configurations, such as a uniform resource locator (URL), internet protocol address (IP address), and the like.

Figure 4:
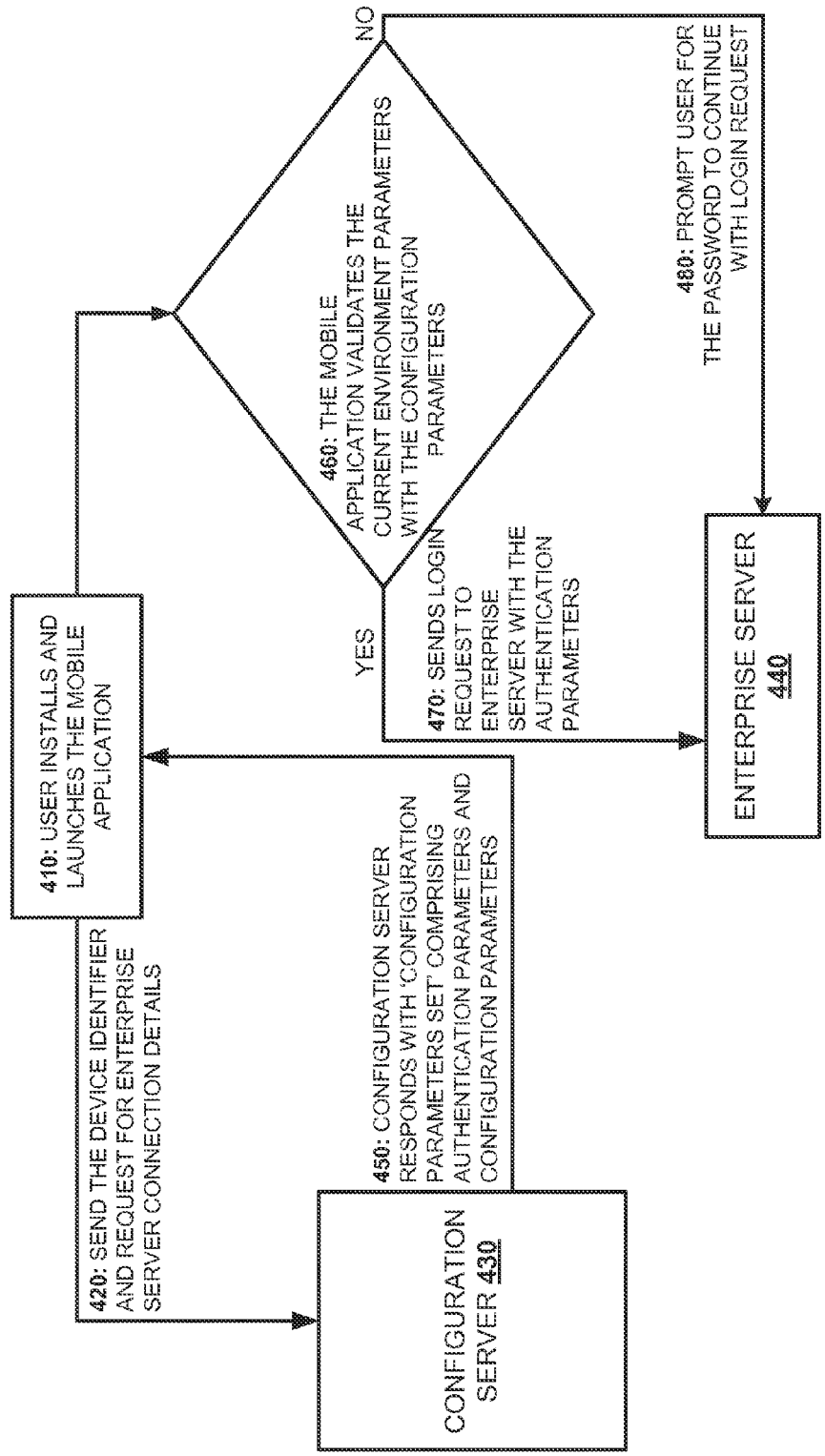
FIG. 4 is a flow diagram illustrating a process of applying restrictions single sign-on for a user of a mobile device, according to one embodiment.

FIG. 4 illustrates a flow diagram for applying restrictions in single sign-on for a user of a mobile device, according to one embodiment. At 410, the user installs and launches a mobile application from the mobile device. At 420, the mobile application automatically sends an encrypted device identifier to a configuration server 430, and requests for connection details corresponding to an enterprise server 440. At 450, based on the device identifier received, a 'configuration parameter set' comprising authentication parameters such as 'user id', password and connectivity details, and configuration parameters such as network identifier, VPN identifier and location from which single sign-on is allowed, is sent to the mobile application. In 460, the mobile application validates environment parameters associated with a current environment, with the configuration parameters fetched, to determine if single sign-on capability is to be allowed or restricted for the user of the current environment.

In case, one of the network identifier, VPN identifier, or location matches with any of the configuration parameters, 470 is executed, where the mobile application automatically sends a login request to the enterprise server 440 with the authentication parameters such as 'user id', password and connectivity details, to establish connectivity with the enterprise server 440 in a single sign-on mode. In case, either of the network identifier, VPN identifier or location does not match with any of the configuration parameters, 480 is executed, where the mobile application prompts the user to enter password to continue login to the enterprise server 440. In one embodiment, authentication parameters can include a certificate instead of 'user id' and password. A certificate contains information about the owner of the certificate, like email address, owner's name, duration of validity, etc. The mobile application can fetch certificate corresponding to the device identifier from the configuration server. This certificate can be used to authenticate the mobile application to the enterprise server 440.

Figure 5:
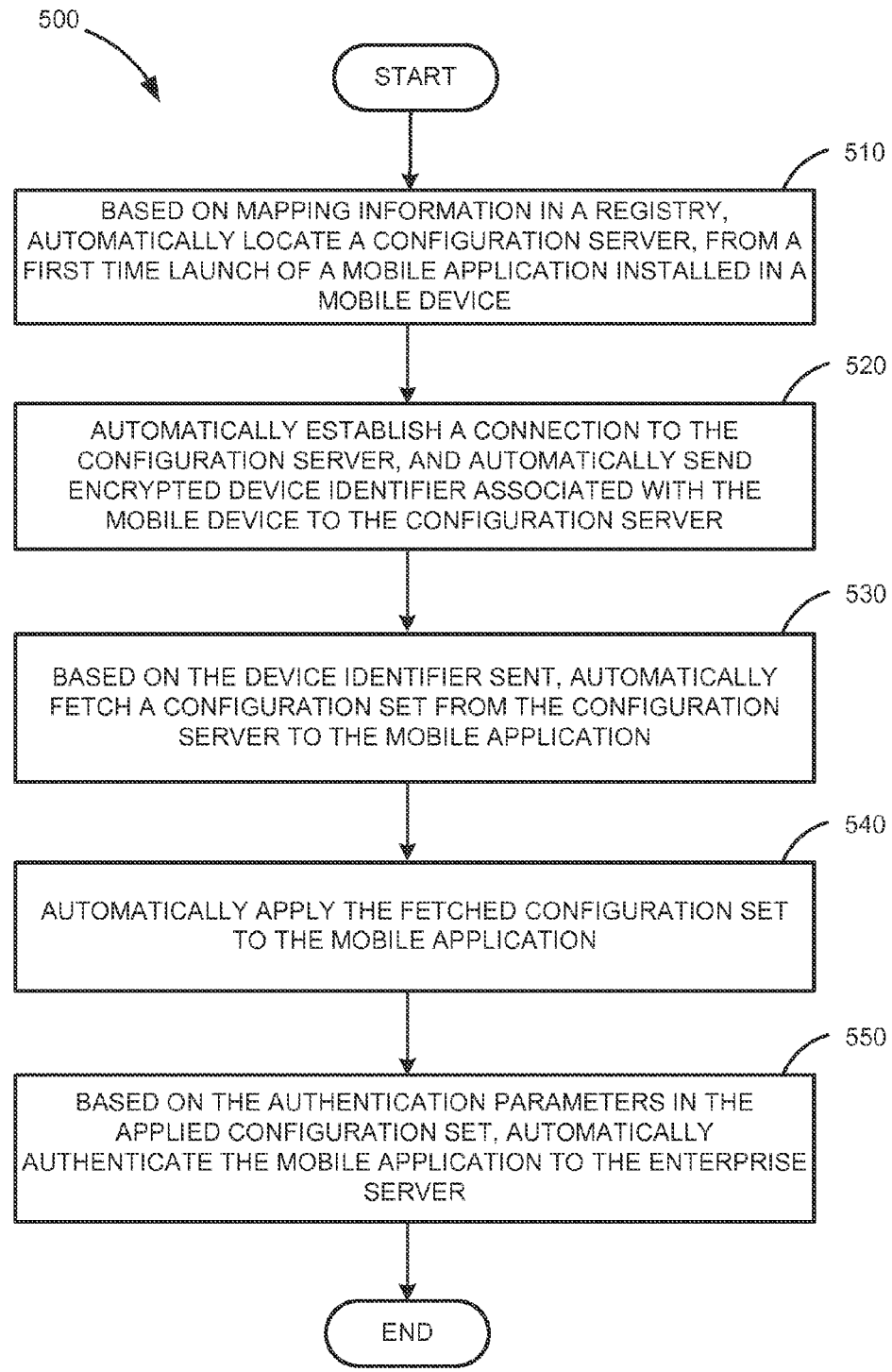
FIG. 5 is a flow diagram of a process of zero-step auto-customization of mobile application, according to one embodiment.

FIG. 5 illustrates a flow diagram of a process 500 of zero-step auto-customization of mobile application, according to one embodiment. At 510, a mobile application installed in a mobile device is launched for a first time. The mobile application automatically locates a configuration server, based on mapping information available in a registry. At 520, the mobile application automatically establishes a connection to the located configuration server, and automatically sends encrypted device identifier associated with the mobile device, to the configuration server. At 530, based on the encrypted device identifier sent, the mobile application automatically fetches a configuration parameters set from the configuration server. The configuration parameters set may comprise configuration parameters, customization parameters, and authentication parameters associated with an enterprise server. At 540, the fetched configuration parameters set are automatically applied to the mobile application. At 550, the mobile application is automatically authenticated to the enterprise server, based on the authentication parameters in the applied configuration parameters set.

The various embodiments described above have a number of advantages. The development of mobile applications is standardized. With zero-step auto-customization of mobile applications, employees using mobile devices of their choice can download the mobile application and use it in a normal way, subject to the customizations applied. When employees launch the downloaded mobile application for the first time, the mobile application is automatically connected to a configuration server, and the configurations are fetched and installed automatically in the mobile application in zero-steps without manual intervention. Thus employees do not have to manually install any additional configurations or customizations for every mobile application. More often, employees do not realize that configurations and customizations are being applied to the mobile application. Time and effort to auto-customize the mobile applications happens in zero-step and proves very efficient.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hardwired circuitry in place of, or in combination with machine readable software instructions.

Figure 6:
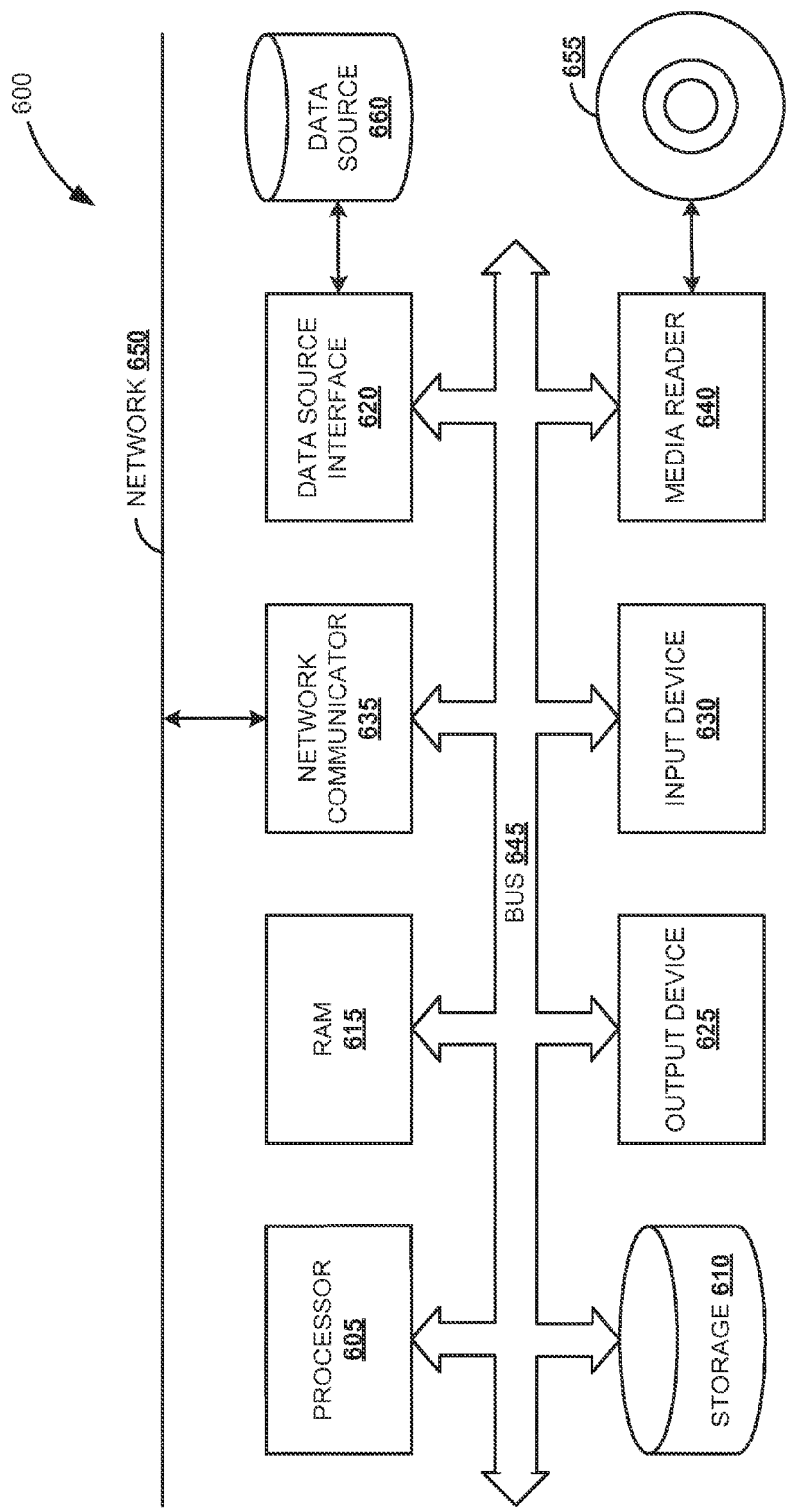
FIG. 6 is a block diagram of an exemplary computer system according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
    based on mapping information in a registry, automatically locate a configuration server in response to a first time launch of a mobile application installed in a mobile device;
    automatically establish a connection to the configuration server, and automatically send an encrypted device identifier associated with the mobile device to the configuration server;
    based on the device identifier sent, automatically fetch a configuration parameters set from the configuration server to the mobile application, wherein the configuration parameters set comprises configuration parameters, customization parameters, and authentication parameters associated with an enterprise server;
    automatically apply the fetched configuration parameters set to the mobile application;
    based on the authentication parameters in the applied configuration parameters set, automatically authenticate the mobile application to the enterprise server; and
    based on the configuration parameters in the applied configuration parameters set, restrict single sign-on capability in one or more environments associated with the mobile device executing the mobile application.

2. The article of manufacture of claim 1, wherein the mapping information in the registry comprises mappings of one or more application identifiers associated with one or more mobile applications to one or more non-qualified machine names.

3. The article of manufacture of claim 1, wherein automatically locating the configuration server comprises:
    automatically resolving a non-qualified machine name to a fully qualified domain name (FQDN) based on a network of a user of the mobile device executing the mobile application.

4. The article of manufacture of claim 1, wherein automatically fetching the configuration parameters comprises:
    automatically caching the fetched configuration parameters set in the mobile application; and
    in subsequent connections to the configuration server, automatically fetching a modified portion of the configuration parameters set to the mobile application.

5. The article of manufacture of claim 1, wherein restricting single sign-on capability comprises:
    determining a current environment of the mobile device and environment parameters associated with the current environment;
    upon determining a match between at least one of the environment parameters and at least one of the configuration parameters, automatically sending a login request with the authentication parameters to the enterprise server; and
    in response to the login request sent, the enterprise server automatically authenticating the login request and providing a user of the mobile device access based on the configuration parameters.

6. The article of manufacture of claim 5, further comprising instructions which when executed by the computer further causes the computer to:
    upon determining that there is no match between at least one of the environment parameters and at least one of the configuration parameters:
        restrict the single sign-on capability automatically for the current environment; and
        receive a prompt for a password from the enterprise server for authentication to the enterprise server.

7. A computer implemented method for zero-step auto-customization of mobile application, the method comprising:
    based on mapping information in a registry, automatically locating a configuration server in response to a first time launch of a mobile application installed in a mobile device;
    automatically establishing a connection to the configuration server, and automatically send an encrypted device identifier associated with the mobile device to the configuration server;
    based on the device identifier sent, automatically fetching a configuration parameters set from the configuration server to the mobile application, wherein the configuration parameters set comprises configuration parameters, customization parameters, and authentication parameters associated with an enterprise server;
    automatically applying the fetched configuration parameters set to the mobile application;
    based on the authentication parameters in the applied configuration parameters set, automatically authenticating the mobile application to the enterprise server; and
    based on the configuration parameters in the applied configuration parameters set, restricting single sign-on capability in one or more environments associated with the mobile device executing the mobile application.

8. The method of claim 7, wherein the mapping information in the registry comprises mappings of one or more application identifiers associated with one or more mobile applications to one or more non-qualified machine names.

9. The method of claim 7, wherein automatically locating the configuration server further comprising:
resolving a non-qualified machine name to a fully qualified domain name (FQDN) based on a network of a user of the mobile device executing the mobile application.

10. The method of claim 7, wherein automatically fetching the configuration parameters set further comprising:
automatically caching the fetched configuration parameters set in the mobile application; and
in subsequent connections to the configuration server, automatically fetching a modified portion of the configuration parameters set to the mobile application.

11. The method of claim 7, wherein restricting single sign-on capability further comprising:
determining a current environment of the mobile device and environment parameters associated with the current environment;
upon determining a match between at least one of the environment parameters and at least one of the configuration parameters, automatically sending a login request with the authentication parameters to the enterprise server; and
in response to the login request sent, the enterprise server automatically authenticating the login request and providing a user of the mobile device access based on the configuration parameters.

12. The method of claim 11, further comprising:
upon determining that there is no match between at least one of the environment parameters and at least one of the configuration parameters:
restricting the single sign-on capability automatically for the current environment; and
receiving a prompt for a password from the enterprise server for authentication to the enterprise server.

13. A computer system for zero-step auto-customization of mobile application, comprising:
a computer memory to store program code; and
a processor to execute the program code to:
based on mapping information in a registry, automatically locate a configuration server in response to a first time launch of a mobile application installed in a mobile device;
automatically establish a connection to the configuration server, and automatically send encrypted device identifier associated with the mobile device to the configuration server;
based on the device identifier sent, automatically fetch a configuration parameters set from the configuration server to the mobile application, wherein the configuration parameters set comprises configuration parameters, customization parameters, and authentication parameters associated with an enterprise server;
automatically apply the fetched configuration parameters set to the mobile application;
based on the authentication parameters in the applied configuration parameters set, automatically authenticate the mobile application to the enterprise server; and
based on the configuration parameters in the applied configuration parameters set, restrict single sign-on capability in one or more environments associated with the mobile device executing the mobile application.

14. The system of claim 13 wherein the mapping information in the registry comprises mappings of one or more application identifiers associated with one or more mobile applications to one or more non-qualified machine names.

15. The system of claim 13, wherein automatically locating the configuration server further executes the program code to:
resolve a non-qualified machine name to a fully qualified domain name (FQDN) based on a network of a user of the mobile device executing the mobile application.

16. The system of claim 13, wherein automatically fetching the configuration parameters set further executes the program code to:
automatically cache the fetched configuration parameters set in the mobile application; and
in subsequent connections to the configuration server, automatically fetch a modified portion of the configuration parameters set to the mobile application.

17. The system of claim 13, wherein restricting single sign-on capability further executes the program code to:
determine a current environment of the mobile device and environment parameters associated with the current environment;
upon determining a match between at least one of the environment parameters and at least one of the configuration parameters, automatically send a login request with the authentication parameters to the enterprise server;
in response to the login request sent, the enterprise server automatically authenticating the login request and providing a user of the mobile device access based on the configuration parameters;
upon determining that there is no match between at least one of the environment parameters and at least one of the configuration parameters:
restricting the single sign-on capability automatically for the current environment; and
receiving a prompt for a password from the enterprise server for authentication to the enterprise server.

* * * * *